United States Patent [19]

Mattei et al.

[11] Patent Number: 4,491,292
[45] Date of Patent: Jan. 1, 1985

[54] STRUT STRUCTURE FOR SUSPENDING LOADS UNDER AIRCRAFT

[75] Inventors: Jean-Pierre Mattei, La Varenne; Pierre F. Coutin, Paris, both of France

[73] Assignee: R. Alkan & Cie, France

[21] Appl. No.: 521,022

[22] Filed: Aug. 9, 1983

Related U.S. Application Data

[62] Division of Ser. No. 175,545, Aug. 5, 1980.

[30] Foreign Application Priority Data

Sep. 8, 1979 [FR] France ............................ 79 20398

[51] Int. Cl.³ ............................................ F16M 13/00
[52] U.S. Cl. ................................... 248/1; 52/309.1;
52/309.16
[58] Field of Search ................... 248/1, 200, 251, 317;
211/123; 52/39, 309.1, 309.16

[56] References Cited

U.S. PATENT DOCUMENTS

| 904,578 | 11/1908 | Virgie | 248/317 |
| 1,757,343 | 5/1930 | Steinmuller | 248/317 X |
| 1,898,725 | 2/1933 | Hamilton | 248/226.3 |
| 3,006,591 | 10/1961 | Somes | 248/317 |
| 3,430,953 | 3/1969 | Teetor | 248/251 X |
| 4,193,571 | 3/1980 | Bula | 52/39 X |
| 4,312,162 | 1/1982 | Medney | 52/309.16 |

FOREIGN PATENT DOCUMENTS 235539 7/1959 Australia .......................... 52/309.16

Primary Examiner—William H. Schultz
Attorney, Agent, or Firm—William A. Drucker

[57] ABSTRACT

This strut structure for suspending loads under aircraft comprises essentially a hollow beam comprising at least one element of compound material consisting mainly of mineral fibres embedded in a binder forming setting resin such as expoxide resin, this element extending throughout the length of the beam, and metal members joined to the compound material element or elements for rigidly connecting the beam to the aircraft and to the means from which the load is suspended under the aircraft.

4 Claims, 7 Drawing Figures

U.S. Patent   Jan. 1, 1985   Sheet 1 of 2   4,491,292
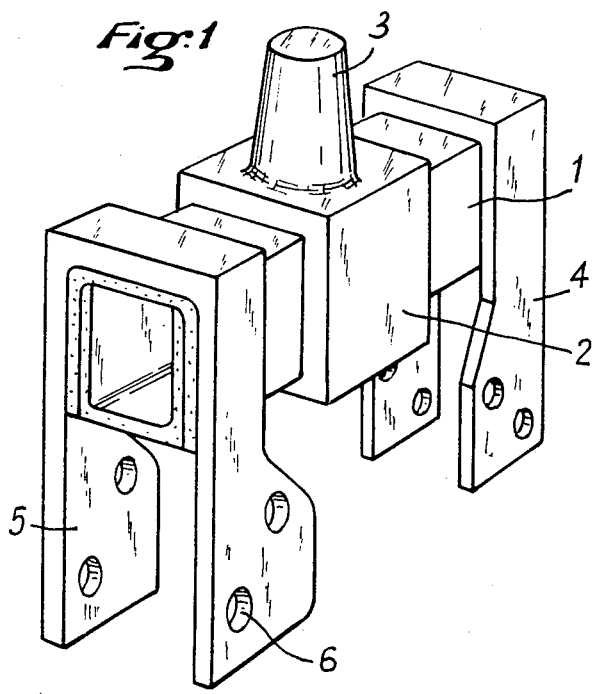
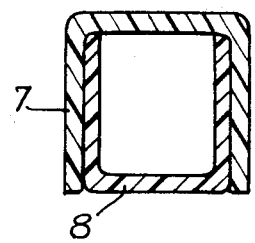
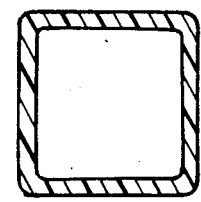
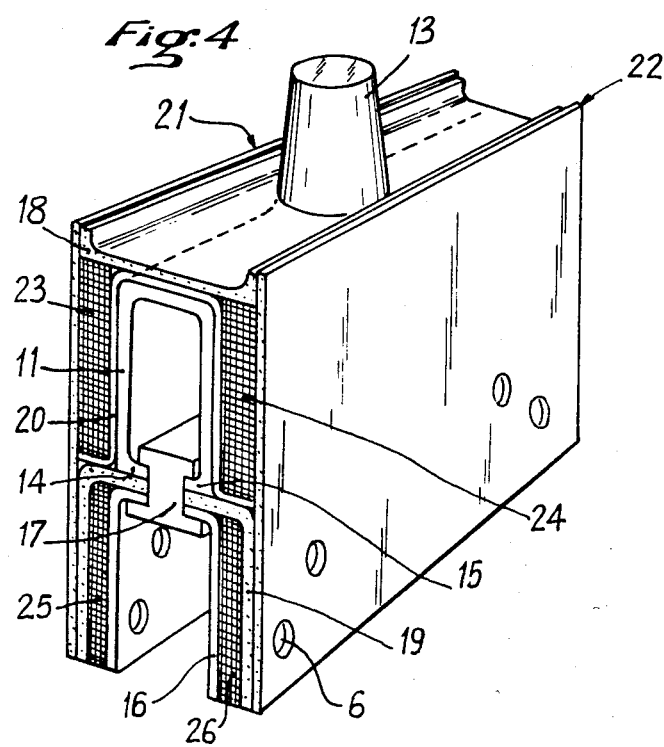

STRUT STRUCTURE FOR SUSPENDING LOADS UNDER AIRCRAFT

This application is a division, of application Ser. No. 175,545, filed Aug. 5, 1980.

BACKGROUND OF THE INVENTION

This invention relates in general to strut structures of the type intended for suspending loads from aircraft.

It is known that compound materials consisting of mineral fibres such as glass fibres, boron fibres and more particularly carbon fibres embedded in a resin binder, notably epoxide resin, may attain a high degree of mechanical strength and more particularly a high rigidity whereby structures having specific strength and rigidity values comparing with those of metal structures while having a considerably reduced weight can be obtained.

SUMMARY OF THE INVENTION

It is the primary object of this invention to provide a structure for beams, struts, poles or masts of the type designed for carrying or suspending loads under aircraft, which takes advantage of the specific properties of the above-mentioned compound materials. In the following disclosure, the term "compound material" will therefore refer, as in the preceding paragraph, to a material consisting essentially of high-strength fibres embedded in a setting resin binder such as epoxide resin.

The structure according to the present invention consists essentially of a hollow beam comprising at least one element of compound material extending throughout the beam length and metal elements joined to said compound material elements and interconnecting on the one hand said beam and the aircraft structure, and on the other hand the beam and the load to be carried under the aircraft.

Preferably, the beam configuration is generally simple, for example of parallelipipedic shape, the elements of compound material being cemented or bonded to the metal elements along flat surfaces parallel to the beam axis.

According to a complementary feature characterizing this invention, the beam constituting the structure for supporting a load under aircraft is so designed that stresses are transmitted from the load to the aircraft and vice versa through the medium of metal members reinforced by elements made of compound material which partake in the general strength of the assembly, and more particularly in its torsional strength and rigidity.

Still more particularly, the beam composition is such that the loads are retained along two different paths, whereby the resistance to stress exerted in case of failure of one path is maintained according to the so-called "fail-safe" safety principle; in this case, the stress will be directed for example on the one hand through the metal elements and on the other hand through the compound material elements, and the various component elements will be assembled by using a suitable bonding procedure. The component elements of this hyperstatic structure are calculated as a function of the various forces, of both aerodynamic and inertia types, applied to the load carried under the aircraft.

BRIEF DESCRIPTION OF THE DRAWINGS

FIG. 1 is a perspective view of a parallelipipedic core of compound material straddled by metal members for connecting the core to the aircraft and to the load supporting device;

FIG. 2 is a cross section showing the core of FIG. 1, consisting of two cemented interfitting elements;

FIG. 3 is a cross section showing a core of similar compound material but consisting of a single box-sectioned element of square or rectangular cross-sectional shape;

FIG. 4 is a perspective view showing a metal core completed and reinforced by elements made of compound material;

FIGS. 5 and 6 are diagrammatic sectional views showing details of the internal textures of the reinforcing compound material, namely of the honeycomb and sine type, respectively.

DESCRIPTION OF THE PREFERRED EMBODIMENTS

Figure 7:
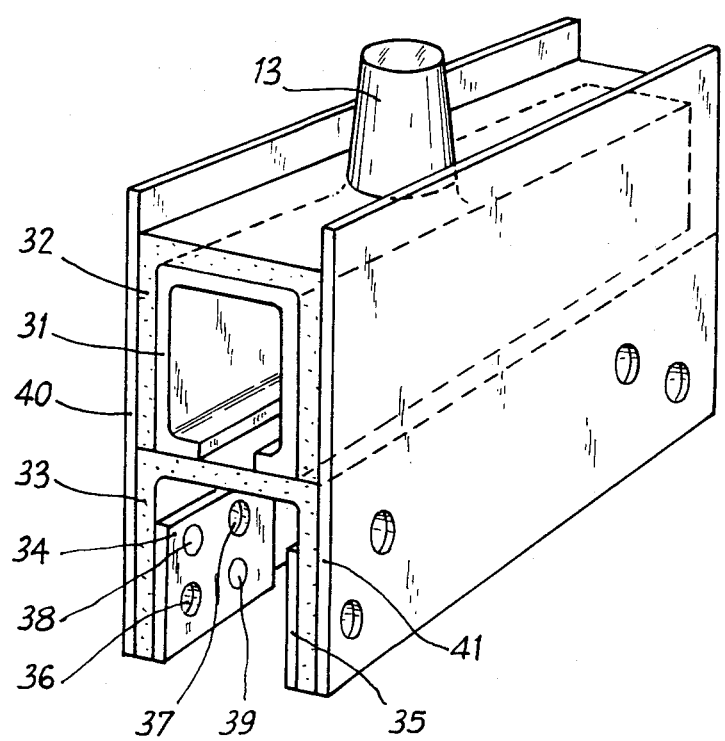
FIG. 7 is a perspective view showing a composite structure also made of metal elements associated with elements of compound material.

Referring first to FIG. 1, the reference numeral 1 therein designates the core of a structure for supporting loads under aircraft. This core 1 is a parallelipipedic beam having a box-shaped cross section, made of compound material such as carbon-fibre reinforced epoxide resin. This core 1 is encompassed by the metal member 2 interconnecting the load and the aircraft, which comprises a tapered top projecting plug 3 of which the details are well-known in the art and therefore not shown or described herein. The device actually intended for suspending or supporting the load under aircraft (not shown) is adapted to engage the gap left between pairs of metal straps 4, 5 straddling the core 1 on either side of plug 3 and formed with holes 6 for releasably coupling same to the load suspension or carrier device. The particularly simple shape of the core 1 of compound material greatly simplifies its manufacture, and the shrink-on or clamping metal members 2, 4 and 5 tend to reinforce the holding of said beam without impairing its strength, the various elements being assembled by bonding or cementing. Full advantage of the properties of the compound material constituting the core of the structure illustrated is taken, notably in the matter of strength in relation to weight. The simplified design of the assembly is such that its optimal dimensions can easily be calculated.

The parallelipipedic box-sectioned core 1 of compound material may comprise for instance an assembly of two U-sectioned elements 7 and 8 (FIG. 2) having their bases opposed to each other; these elements 7, 8 are assembled by bonding. Alternatively, this core 1 may consist of a single square-sectioned tubular element (FIG. 3) which, though structurally simpler, requires a considerably more complicated equipment for its manufacture.

In FIG. 4 the reference numeral 11 designates a hollow longitudinal metal member supporting the top plug 13 for coupling same to the aircraft, and reference numerals 14, 15 designate a pair of opposite in-turned lower lips for assembling this longitudinal member with metal strap 16, the latter for fixing the carrier device (not shown) through the medium of a longitudinal I-sectional coupling member 17 of which the central web is positioned in the slot formed between said lips 14 and 15 and also between similar in-turned lips of strap 16. A relatively shallow longidudinal U-sectioned member 18 of compound material has a central through-hole formed therein for receiving the tapered top plug 13, and another U-sectioned longitudinal member 19 of compound material is disposed astride said metal strap 16; finally, an omega-sectioned longitudinal member 20 also of compound material encloses the hollow metal member 11. Side plates 21, 22 of compound material enclose stiffening elements 23, 24 lining the side arms of the omega-sectioned member 20, and other stiffening elements 25, 26 line the side arms of the U-sectioned longitudinal member 19 of compound material. Preferably, these stiffening elements consist of panels having a suitable texture, for example a honeycomb texture as shown in FIG. 5 or a sine wave or corrugated texture as shown in FIG. 6 in order to obtain a high degree of rigidity notwithstanding a substantial weight reduction.

It is clear that the structure illustrated in FIG. 4 makes full use of the so-called "fail safe" technique, for the efforts are transmitted between the load carrying device secured by means of the pairs of aligned holes 6 and the means interconnecting the structure and the aircraft; namely the tapered top plug 23, by means of the metal chain comprising the members 16, 17 and 11, on the one hand, and by means of the chain of compound material (fibres plus epoxide resin) comprising the member 19, 20, 18 and side plates 21, 22, all bonded to one another, on the other hand.

FIG. 7 illustrates a modified structure based on the same principles but simplified by reducing the number of component elements, for example when this simplification is permitted by a reduction in the weight of the load to be suspended under the aircraft. The reference numeral 31 designates a metal hollow longitudinal member similar to element 11 of the preceding form of embodiment, which comprises an integral tapered top plug 13 and is covered by a U-sectioned longitudinal member 32 of compound material, through which said top plug 13 protrudes as shown. Another U-sectioned longitudinal member 33 also of compound material constitutes a strap for receiving the load carrying device (not shown). The inner faces of the side arms of this member 33 are lined with metal reinforcing plates 34, 35 through which pairs of holes 36, 37 for fixing the load carrier device and other pairs of holes 38, 39 for assembling said plates 34 and 35 to the compound material member 33, are provided. Side plates 40, 41 similar to those 21 and 22 of FIG. 4, are bonded to the lateral faces of members 32, 33 for constituting a compact, unitary structure.

In this exemplary structure the efforts applied to the load are transmitted through the carrier or suspension device to the structure at the level of fixing holes 36 and 37 via metal members 34 and 35 and compound material members 33, 40 and 41. These various component elements are safely assembled on the one hand by bonding or cementing and on the other hand as a consequence of the expansion of the compound material constituting element 33 into the holes 38 and 39 formed for this purpose in metal members 34 and 35. Thus, the stress path may be followed on the one hand along the side plates 40, 41 and through the compound material member 32 receiving the tapered top plug 13 therethrough, and on the other hand through the compound material member 33 and the metal member 31 assembled by bonding.

In all the cases described hereinabove, the substantial reduction in the volume of steel parts, as a consequence of the use of lighter yet extremely strong compound material, is attended by considerable reduction in the weight of the assembly.

It will be readily understood by those conversant with the art that the specific forms of embodiment disclosed herein with reference to the attached drawing should not be construed as limiting the scope of the invention, since various modifications and changes may be brought thereto without departing from the basic principles of the invention set forth in the appended claims. Thus, the structure of this invention is applicable to devices intended for carrying several separate loads, though the above description refers for the sake of clarity and simplification to the fixing of a single carrier device.

What we claim is:

1. A strut structure for connecting a load carrier device to an aircraft, which comprises:
   (a) a horizontal hollow supporting beam comprising a metal hollow longitudinal member disposed within a first U-sectioned longitudinal member made of compound material comprising mineral fibers embedded in a resin forming a setting binder,
   (b) a metal connecting member to the aircraft rigid with an upper face of said metal longitudinal member and passing through an upper intermediate portion of said first longitudinal member made of compound material,
   (c) a second U-sectioned longitudinal member made of compound material having an intermediate portion rigid with said hollow supporting beam,
   (d) metal members each being provided with means for fixing a load carrier device and being rigid with registering portions of said U-sectioned second longitudinal member, and
   (e) side plates made of compound material fixed on external portions of said first and second U-sectioned longitudinal members made of compound material, so that transmission of stress between the load carrier device and the aircraft is performed along two different paths, the one comprising the side plates and the U-sectioned first longitudinal member made of compound material through which passes the metal connecting member while the other comprises said U-sectioned second longitudinal member made of compound material and said metal hollow longitudinal member.

2. A strut structure for connecting a load carrier device to an aircraft, which comprises:
   (a) a horizontal hollow supporting beam comprising a metal hollow longitudinal member disposed within a first U-sectioned longitudinal member made of compound material comprising mineral fibers embedded in a resin forming a setting binder,
   (b) a metal connecting member to the aircraft rigid with an upper face of said metal longitudinal member and passing through an upper intermediate portion of said first longitudinal member made of compound material,
   (c) a U-sectioned metal strap disposed under said metal longitudinal member and having an intermediate portion connected thereto through a metal coupling member, said strap being provided with means for fixing a load carrier device,
   (d) a second U-sectioned longitudinal member made of compound material surrounding said metal strap and having an intermediate portion rigid with said U-sectioned first longitudinal member made of compound material, (e) an upper U-sectioned longitudinal member of compound material being rigid with an upper portion of said first longitudinal member of compound material and provided with a hole for receiving said metal connecting member, and (f) side plates of compound material, being rigid on each side of said structure with an external face of said second longitudinal member of compound material and with a corresponding external face of said upper U-sectioned longitudinal member of compound material, so that transmission of stress between the load carrier device and the aircraft is performed along two different paths, on the one hand along a metal chain comprising the metal strap, the metal coupling member, the metal longitudinal member and the metal connecting member and, on the other hand, along a compound material chain consisting of said second U-sectioned longitudinal member, said first U-sectioned longitudinal member, said upper U-sectioned longitudintal member and said side plates.

3. A strut structure as claimed in claim 2, wherein stiffening elements made of cellular texture are disposed between said first U-sectioned longitudinal member and said side plates.

4. A strut structure as claimed in claim 2, wherein stiffening elements made of cellular texture are disposed between said metal strap and said second U-sectioned longitudinal member.

* * * * *